US012319314B2

United States Patent
Maeda et al.

(10) Patent No.: US 12,319,314 B2
(45) Date of Patent: Jun. 3, 2025

(54) VEHICLE INTEGRATED-CONTROL DEVICE AND VEHICLE INTEGRATED-CONTROL METHOD

(71) Applicant: Hitachi Astemo, Ltd., Hitachinaka (JP)

(72) Inventors: Kenta Maeda, Tokyo (JP); Masaru Yamasaki, Tokyo (JP); Takahiro Ito, Tokyo (JP); Kentarou Ueno, Hitachinaka (JP); Shuji Ohshita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 140 days.

(21) Appl. No.: 18/037,658

(22) PCT Filed: Nov. 10, 2021

(86) PCT No.: PCT/JP2021/041337
§ 371 (c)(1),
(2) Date: May 18, 2023

(87) PCT Pub. No.: WO2022/113740
PCT Pub. Date: Jun. 2, 2022

(65) Prior Publication Data
US 2023/0415775 A1    Dec. 28, 2023

(30) Foreign Application Priority Data
Nov. 25, 2020   (JP) .................................. 2020-194869

(51) Int. Cl.
*B60W 40/08*    (2012.01)
*B60W 50/10*    (2012.01)
*B60W 60/00*    (2020.01)

(52) U.S. Cl.
CPC ........ *B60W 60/0013* (2020.02); *B60W 40/08* (2013.01); *B60W 50/10* (2013.01); *B60W 2540/18* (2013.01); *B60W 2540/221* (2020.02)

(58) Field of Classification Search
None
See application file for complete search history.

(56) References Cited

U.S. PATENT DOCUMENTS

2005/0027402 A1* 2/2005 Koibuchi .......... B60W 30/1819
                                                        701/1
2018/0052000 A1  2/2018 Larner et al.
(Continued)

FOREIGN PATENT DOCUMENTS

DE    102020000441 A1   9/2020
JP    H07-215036 A      8/1995
(Continued)

OTHER PUBLICATIONS

PCT/JP2021/041337 International Search Report dated Jan. 11, 2022, 3 pgs.
(Continued)

*Primary Examiner* — Justin S Lee
(74) *Attorney, Agent, or Firm* — Volpe Koenig

(57) ABSTRACT

A vehicle integrated-control device generates internal commands that supplement insufficient external commands in an environment where external commands are insufficient and that integrally controls each actuator to improve the operational feeling of the driver and occupant ride comfort. The vehicle integrated-control device integrally controls actuators mounted in a vehicle to control the vehicle using six control axes which are front-rear, left-right, up-down, roll, pitch, and yaw control axes, and comprises a command value acquisition unit that acquires an external command corresponding to at least one and not more than six control axes for realizing a desired driving operation; a command
(Continued)

value supplementation unit that, based on the external command, generates an internal command corresponding to a control axis other than the control axes corresponding to the external command; and an operation amount control distribution unit that controls the plurality of actuators based on the external command and the internal command.

6 Claims, 9 Drawing Sheets

(56) References Cited

U.S. PATENT DOCUMENTS

| | | |
|---|---|---|
| 2018/0297594 A1 | 10/2018 | Takahashi et al. |
| 2019/0031191 A1 | 1/2019 | Satoh et al. |
| 2019/0047348 A1 | 2/2019 | Mihailescu et al. |
| 2020/0047735 A1 | 2/2020 | Niu et al. |
| 2021/0403039 A1 | 12/2021 | Horigome et al. |
| 2022/0135054 A1 | 5/2022 | Nakamura et al. |

FOREIGN PATENT DOCUMENTS

| | | |
|---|---|---|
| JP | 2018-047760 A | 3/2018 |
| JP | 2019-182104 A | 10/2019 |
| JP | 2019-196154 A | 11/2019 |
| JP | 2020-109414 A | 7/2020 |
| JP | 2020-142761 A | 9/2020 |
| WO | 2017/145555 A1 | 8/2017 |
| WO | 2020/170640 A1 | 8/2020 |

OTHER PUBLICATIONS

Extended European Search Report issued on Oct. 1, 2024 for European Patent Application No. 21897714.8.

* cited by examiner

VEHICLE INTEGRATED-CONTROL DEVICE AND VEHICLE INTEGRATED-CONTROL METHOD

TECHNICAL FIELD

The present invention relates to a vehicle integrated-control device and a vehicle integrated-control method that control the attitude of a vehicle so as to improve the operational feeling of the driver and occupant ride comfort.

BACKGROUND ART

As a conventional vehicle attitude control device for controlling the attitude of a vehicle, the device disclosed in PTL 1 is known. For example, the Abstract of PTL 1 discloses, in relation to a vehicle attitude control device that enables "power consumption for attitude control to be further reduced without sacrificing the performance of attitude control", "a vehicle attitude control device 30 that controls the attitude of a vehicle provided with a greater number of attitude control devices than the number of degrees of freedom of attitude control, wherein a target value calculation unit 42 calculates a target motion state quantity of the number of degrees of freedom based on the state of the vehicle, and wherein a control force calculation unit 44 calculates a control force vector so that the square norm of the control force vector for driving the attitude control devices is minimized and the target motion state quantity is realized".

Further, as is clear from Formula 3 and from the disclosures of paragraph of PTL 1: "the target value calculation unit 42 outputs a calculated target up-down force Fz, target roll moment Mx, target pitch moment My, target yaw moment Mz, and target front-rear force Fx to the control force calculation unit 44.", in the vehicle attitude control device of PTL 1, the control force calculation unit 44 calculates control force vectors such as a control driving force $F_d$ and an active suspension generation force $F_{AS}$, based on five pieces of information on the target forces Fx and Fz and the target moments Mx, My, and Mz which are calculated by the target value calculation unit 42, thereby realizing the desired attitude control.

CITATION LIST

Patent Literature

PTL 1: JP 2018-47760 A

SUMMARY OF INVENTION

Technical Problem

However, the vehicle attitude control of PTL 1 is mainly control for suppressing power consumption, and is not intended to improve the operational feeling of the driver or occupant ride comfort. For this reason, in the vehicle attitude control of PTL 1, the target left-right force Fy is not considered when calculating the control force vector, and as a result of suppressing the power consumption, there is also a possibility of generation of a left-right force that impairs the operational feeling of the driver and occupant ride comfort.

Therefore, an object of the present invention is to provide a vehicle integrated-control device and a vehicle integrated-control method that generate internal commands that supplement insufficient external commands in an environment where external commands are insufficient and that integrally control each actuator so as to improve the operational feeling of the driver and occupant ride comfort.

Solution to Problem

In order to solve the above problems, a vehicle integrated-control device of the present invention is a vehicle integrated-control device that integrally controls a plurality of actuators mounted in a vehicle to control the vehicle using six control axes which are front-rear, left-right, up-down, roll, pitch, and yaw control axes, the vehicle integrated-control device including a command value acquisition unit that acquires an external command corresponding to at least one and not more than six control axes for realizing a desired driving operation; a command value supplementation unit that, based on the external command, generates an internal command corresponding to a control axis other than the control axes corresponding to the external command; and an operation amount control distribution unit that controls the plurality of actuators based on the external command and the internal command.

Advantageous Effects of Invention

With the vehicle integrated-control device and the vehicle integrated-control method of the present invention, even if external commands are insufficient, internal commands to supplement the insufficient external commands are generated, and each actuator can be integrally controlled so as to improve the operational feeling of the driver and occupant ride comfort.

DESCRIPTION OF EMBODIMENTS

Hereinafter, embodiments according to the present invention will be described with reference to the drawings.

First Embodiment

First, a vehicle integrated-control device according to a first embodiment of the present invention will be described with reference to FIGS. 1 to 8.

<Overall Configuration of Vehicle 1>

Figure 1:
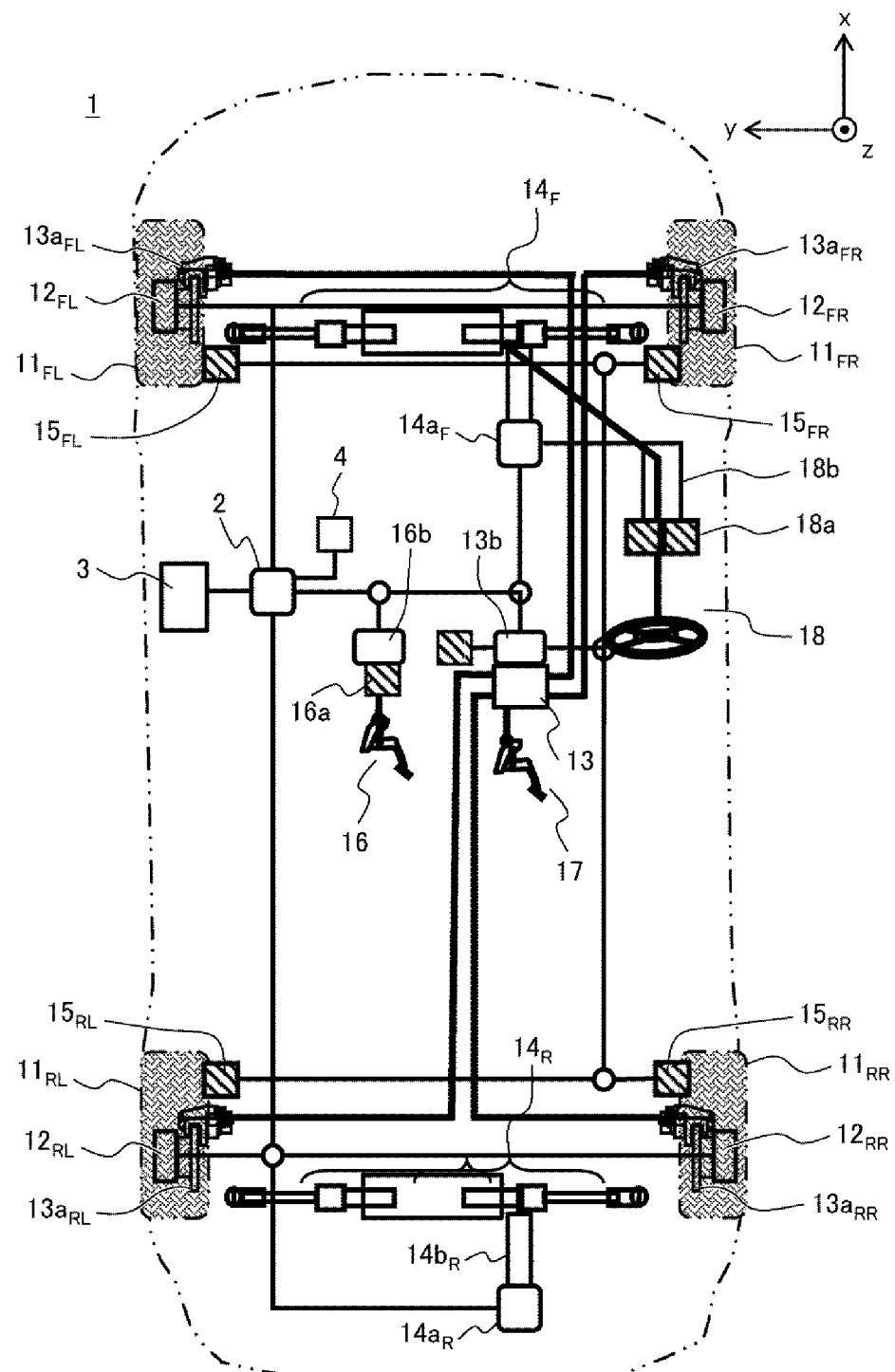
FIG. 1 is a plan view illustrating the overall configuration of a vehicle according to a first embodiment.

FIG. 1 is a plan view illustrating the overall configuration of a vehicle 1 according to the present embodiment. In FIG. 1, "2" denotes a vehicle integrated-control device, "3" denotes an external control device, "4" denotes a combined sensor, "11" denotes a wheel, "12" denotes a motor, "13" denotes a brake mechanism, "14" denotes a steering mechanism, "15" denotes a suspension, "16" denotes an accelerator pedal, "17" denotes a brake pedal, and "18" denotes a steering wheel. In the drawing, FL is a reference sign indicating a configuration corresponding to the front left, FR denotes the front right, RL denotes the rear left, and RR denotes the rear right. Taking the wheels 11 as an example, $11_{FL}$, $11_{FR}$, $11_{RL}$, and $11_{RR}$ denote the front left wheel, the front-right wheel, the rear left wheel, and the rear-right wheel, respectively. In addition, F is a reference sign indicating a configuration corresponding to the front side, and R denotes the rear side.

Hereinafter, the front-rear direction of the vehicle 1 is defined as an x-axis (the front direction is positive), the left-right direction is defined as a y-axis (the left direction is positive), and the up-down direction is defined as a z-axis (the up direction is positive), and details of each configuration will be sequentially described.

<Vehicle Integrated-Control Device 2>

The vehicle integrated-control device 2 is a control device that integrally controls the respective actuators of the motors 12, the brake mechanism 13, the steering mechanism 14, and the suspension 15 in response to operation by the driver, external commands from the external control device 3, and detection signals of the combined sensor 4 (detection signals pertaining to control axes for a total of six degrees of freedom, namely, front-rear acceleration, left-right acceleration, up-down acceleration, and the roll, pitch, and yaw rates). Specifically, the vehicle integrated-control device 2 is an electronic control unit (ECU) including hardware such as a CPU or other arithmetic device, a main storage device such as a semiconductor memory, an auxiliary storage device, and a communication device. Further, the arithmetic device executes a program, which is loaded from the auxiliary storage device to the main storage device, to implement each function to be described below. Hereinafter, such well-known technology will, where appropriate, be omitted from the description.

<External Control Device 3>

The external control device 3 is a host controller for executing driving support control and automatic driving control via the vehicle integrated-control device 2, and calculates a speed command value and an acceleration command value for realizing adaptive cruise control (ACC) for following a preceding vehicle, and a yaw command value for realizing lane keep control (LKC) that maintains travel in a lane, and the like, on the basis of external information acquired by various external sensors (camera, radar, LiDAR, etc.) that are not illustrated, and outputs the calculated values to the vehicle integrated-control device 2 as external commands. Note that, although the vehicle integrated-control device 2 and the external control device 3 are separate from each other in FIG. 1, both devices may be realized by one ECU.

<Drive System>

Here, the drive system of the vehicle 1 will be described. The vehicle 1 has a built-in torque generation device that applies a driving force to each wheel 11, as a principal part of the drive system. An example of the torque generation device is an engine or a motor that transmits a driving force to the pair of left and right wheels 11 via a differential gear and a drive shaft. Another example of the torque generation device is an in-wheel motor-type motor 12 that independently drives each wheel 11. Hereinafter, details of the present embodiment will be described on the premise of the vehicle structure of FIG. 1 in which the in-wheel motor-type motor 12 is mounted on each wheel 11.

In a case where the driver would like to move the vehicle 1 forward (or backward), the driver sets the shift lever to a desired setting and then operates the accelerator pedal 16. At this time, a stroke sensor 16a detects the depression amount of the accelerator pedal 16, and an acceleration control device 16b outputs an accelerator command, which is obtained by converting the depression amount, to the vehicle integrated-control device 2. The vehicle integrated-control device 2 supplies electric power according to an inputted accelerator command, from a battery (not illustrated) to the motor 12 of each wheel, and controls the torque of each motor. As a result, the vehicle 1 can be made to accelerate and decelerate in accordance with operation of the accelerator pedal 16.

In a case where driving support or automatic driving is performed in response to an external command from the external control device 3, the vehicle integrated-control device 2 supplies the desired electric power to the motor 12 of each wheel in response to the inputted external command, thereby controlling the motor torque of each wheel. As a result, the vehicle 1 is made to accelerate and decelerate, and the desired driving support or automatic driving is executed.

<Braking System>

Next, a braking system of the vehicle 1 will be described. The vehicle 1 has a built-in a wheel cylinder 13a that applies a braking force to each wheel 11, as a principal part of the braking system. The wheel cylinder 13a includes, for example, a cylinder, a piston, a pad, a disk rotor, and the like. In the wheel cylinder 13a, the piston is propelled by a hydraulic fluid supplied from a master cylinder, and the pad, which is connected to the piston, is pressed by a disk rotor rotating together with the wheel 11, so that the brake torque acting on the disk rotor becomes the braking force acting between the wheel 11 and the road surface.

In a case where the driver wants to cause the vehicle 1 to brake, the driver operates the brake pedal 17. At this time, the stepping force of the driver stepping on the brake pedal 17 is increased by a brake booster (not illustrated), and the master cylinder generates hydraulic pressure that is substantially proportional to the stepping force. Because the generated hydraulic pressure is supplied to the wheel cylinders $13a_{FL}$, $13a_{FR}$, $13a_{RL}$, and $13a_{RR}$ of each wheel via the brake mechanism 13, the piston of the wheel cylinder 13a of each wheel is pressed against the disk rotor according to the brake pedal operation by the driver, and a braking force is generated in each wheel. Note that, in the vehicle 1 in which the vehicle integrated-control device 2 is mounted, the brake booster and the master cylinder may be omitted. In this case, the brake pedal 17 and the brake mechanism 13 may be directly connected, and the brake mechanism 13 may be a mechanism that directly operates when the driver steps on the brake pedal 17.

In a case where driving support or automatic driving is performed in response to an external command from the external control device 3, the vehicle integrated-control device 2 controls the brake mechanism 13 and the wheel cylinder 13a of each wheel via a brake control device 13b in response to an inputted external command. As a result, the vehicle 1 brakes, and the desired driving support or automatic driving is executed. Note that the brake control device 13b also has a function for converting an operation amount of the brake pedal 17 by the driver into a brake command and outputting the brake command as an external command to the vehicle integrated-control device 2.

<Steering System>

Next, a steering system of the vehicle 1 will be described. The vehicle 1 has a built-in steering mechanism 14 that applies a steering force to each wheel 11, as a principal part of the steering system. Although FIG. 1 illustrates a front steering mechanism $14_F$ that steers the front wheels $11_F$ (the front-left wheel $11_{FL}$ and front-right wheel $11_{FR}$) and a rear steering mechanism $14_R$ that steers the rear wheels $11_R$ (the rear-left wheel $11_{RL}$ and rear-right wheel $11_{RR}$), it is not necessary to provide the steering mechanism 14 in the front and rear, and for example, the rear steering mechanism $14_R$ may be omitted.

In a case where the driver would like to steer the vehicle 1, the driver operates the steering wheel 18. At this time, the "steering torque" and the "steering angle" inputted by the driver via the steering wheel 18 are detected by a steering torque detection device 18a and a steering angle detection device 18b. The front steering control device $14a_F$ controls a front steering motor $14b_F$ on the basis of the detected steering torque and steering angle to generate an assist torque for steering the front wheel $11_F$. Similarly, the rear steering control device $14a_R$ controls the rear steering motor $14b_R$ based on the detected steering torque and steering angle to generate an assist torque for steering the rear wheel $11_R$.

Furthermore, in a case where driving support or automatic driving is performed in response to an external command from the external control device 3, the vehicle integrated-control device 2 controls the steering torque of the steering motor 14b via the steering control device 14a. As a result, the vehicle 1 brakes, and the desired driving support or automatic driving is executed.

<Suspension System>

Next, a suspension system of the vehicle 1 will be described. As a principal part of the suspension system, the vehicle 1 has a built-in suspension 15 for absorbing vibrations and impacts, which are generated in each wheel 11, in order to improve the stability and ride comfort of the vehicle body. The suspension 15 is, for example, a semi-active suspension in which a damper of variable viscosity and a coil spring are combined, or a fully active suspension in which a length-adjustable actuator, a damper, and a coil spring are combined, and the relative distance between the vehicle body and the wheels 11 can be arbitrarily changed.

The vehicle integrated-control device 2 not only improves the ride comfort and the like by controlling the viscosity of the semi-active suspension and the length of the fully active suspension, but also appropriately controls the attitude of the vehicle 1 according to the environment.

<Input/Output of Vehicle Integrated-Control Device 2>

Figure 2:
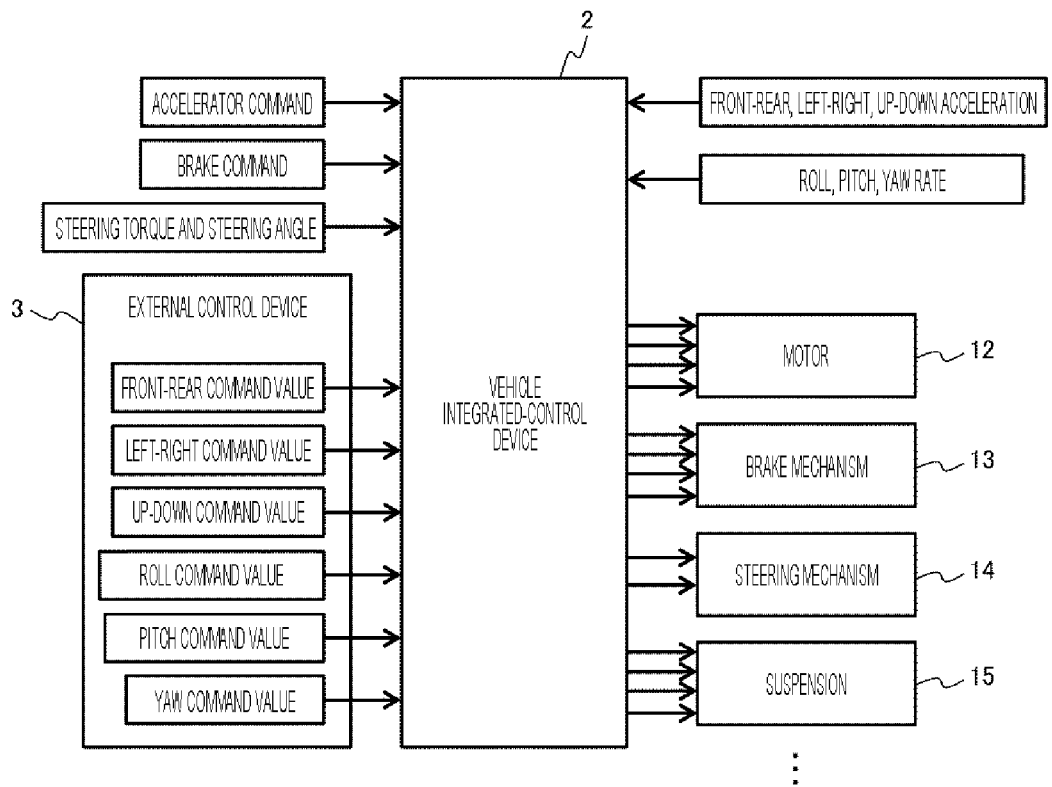
FIG. 2 is a schematic diagram exemplifying input and output signals of a vehicle integrated-control device according to the first embodiment.

Next, the input/output of the vehicle integrated-control device 2 will be described with reference to FIG. 2. FIG. 2 is a schematic diagram exemplifying input and output signals of the vehicle integrated-control device 2. As illustrated herein, an accelerator command, a brake command, a steering torque, a steering angle, and the like, which are generated by the driver operating the accelerator pedal 16, the brake pedal 17, the steering wheel 18, and the like, are inputted to the vehicle integrated-control device 2 as external commands. Further, the vehicle integrated-control device 2 receives inputs of external commands for a total of six degrees of freedom, namely, a front-rear acceleration command value, a left-right acceleration command value, an up-down acceleration command value, a roll command value, a pitch command value, and a yaw command value, which are generated by the external control device 3 during driving support control or automatic driving control. In addition, the vehicle integrated-control device 2 receives, from the combined sensor 4, inputs of the respective detection values for the front-rear, left-right, and up-down acceleration and for the roll, pitch, and yaw rates.

Further, the vehicle integrated-control device 2 appropriately distributes the operation amounts of each of the motors 12 ($12_{FL}$ to $12_{RR}$), the brake mechanism 13 (wheel cylinders $13a_{FL}$ to $13a_{RR}$), the steering mechanism 14 (steering motors $14b_F$, $14b_R$), and the suspension 15 ($15_{FL}$ to $15_{RR}$) based on the external commands and the detection values, and executes the respective control for driving, braking, steering, and suspension, thereby realizing the desired vehicle control including attitude control. Note that the vehicle 1 of FIG. 1 is compatible with manual driving, and thus, FIG. 2 also illustrates an external command issued by the driver. However, the present invention can also be applied to a vehicle 1 which is compatible with only fully automatic driving or remote control, in which case external commands issued by the driver may be omitted.

<Functional Block Diagram of Vehicle Integrated-Control Device 2>

Figure 3:
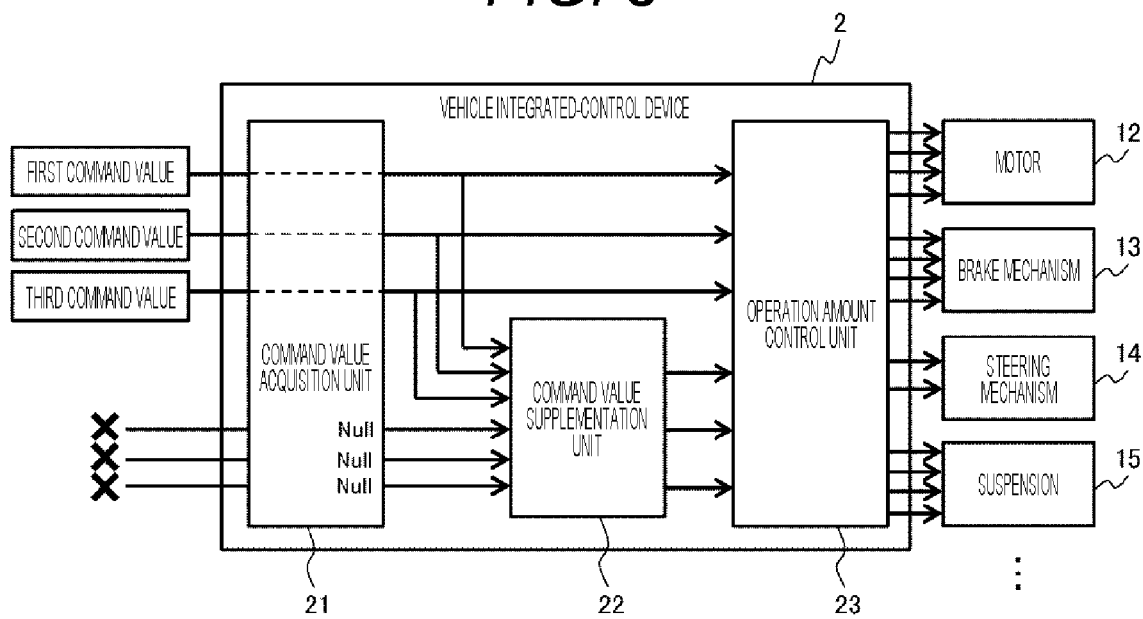
FIG. 3 is a functional block diagram of the vehicle integrated-control device according to the first embodiment.

FIG. 3 is a functional block diagram of the vehicle integrated-control device 2. FIG. 2 illustrates a vehicle integrated-control device 2 to which three types of external commands issued by the driver are inputted and six types of external commands from the external control device 3 are inputted; however, there is also a possibility that any given external command is not inputted depending on the specifications of the external control device 3. Hereinafter, details of the vehicle integrated-control device 2 according to the present embodiment will be described by taking, as an example, a situation where any of the external commands that can be inputted is missing. Note that, hereinafter, any three types of command values among the six types of external commands (the front-rear acceleration command value, the left-right acceleration command value, the up-down acceleration command value, the roll command value, the pitch command value, and the yaw command value) that can be inputted from the external control device 3 are referred to as a first command value to a third command value.

The vehicle integrated-control device 2 according to the present embodiment generates an internal command as a substitute for an external command that has not been inputted and appropriately distributes an operation amount of the motor 12 or the like in consideration of the internal command so that attitude control that does not impair the operational feeling of the driver or occupant ride comfort can be realized even in a case where the types of inputted external commands are insufficient. In order to realize such control, the vehicle integrated-control device 2 of the present embodiment includes a command value acquisition unit 21, a command value supplementation unit 22, and an operation amount control unit 23.

The command value acquisition unit 21 acquires an external command from the external control device 3 and outputs the external command to the command value supplementation unit 22 and the operation amount control unit 23.

Specifically, the inputted type of external command is outputted to the command value supplementation unit 22 and the operation amount control unit 23 without further processing, and an invalid signal (for example, null) is outputted to the command value supplementation unit 22 for a non-inputted type of external command. In a case where three types of external commands (accelerator command, brake command, steering torque, steering angle) derived from the driver are inputted, the command value acquisition unit 21 converts the external commands into a front-rear acceleration command value, a left-right acceleration command value, and a yaw command value of the same type as the external commands from the external control device 3, and outputs the converted values.

The command value supplementation unit 22 generates an internal command of the same type as or as a substitute for an external command of the non-inputted type on the basis of an inputted type of external command, and outputs the generated internal command to the operation amount control unit 23. Note that a method for generating the internal command using the command value supplementation unit 22 will be described below.

The operation amount control unit 23 appropriately controls the distribution of the operation amount of the motor 12 or the like on the basis of an external command inputted from the outside and an internal command generated by the command value supplementation unit 22. As a result, control of the motor 12 and the like to improve the operational feeling of the driver and occupant ride comfort is realized also for the vehicle attitude corresponding to an external command of the type not inputted from the external control device 3.

<Method for Evaluating Occupant Ride Comfort>

Figure 4:
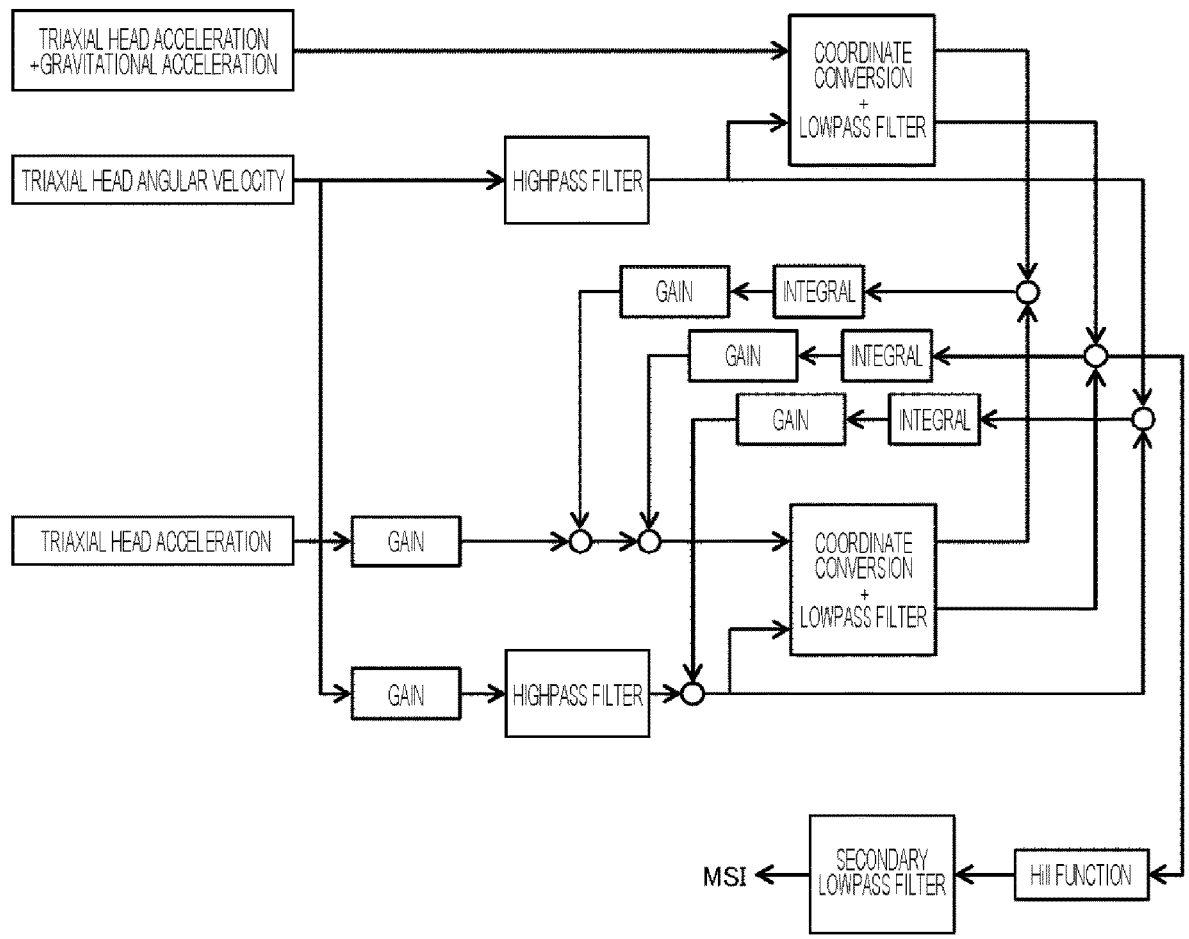
FIG. 4 is an explanatory diagram of an example of a method for calculating motion sickness incidence.

Here, motion sickness incidence (MSI), which is an example of a sensitivity index for evaluating occupant ride comfort, will be described with reference to FIG. 4. As a document relating to motion sickness (so-called "carsickness"), a paper by Takahiro Wada et al. is known (Takahiro WADA, Satoshi FUJISAWA, Katsuya IMAIZUMI, Noriyoshi UECHI, Toshikazu DOI, "Analysis of Concussion Disease-suppressing Effect of Driver's Head Movement," Journal of Society of Automotive Engineers, Vol. 41, No. 5, pp. 999 to 1004, 2010). According to this document, motion sickness incidence (MSI) can be calculated using the method illustrated in FIG. 4. Note that "head acceleration" and "head angular velocity" in the drawing are the acceleration and angular velocity which the head of the occupant is subjected to while the vehicle is being driven.

The motion sickness incidence (MSI) is an index which is such that the smaller the motion sickness incidence is, the better the ride comfort, and hence it is desirable for the command value supplementation unit 22 to generate an internal command so that the motion sickness incidence (MSI) is small. Note that it is assumed that the command value supplementation unit 22 has learned the correspondence relationship between the sensitivity index and the internal command, and is capable of generating an internal signal for improving the motion sickness incidence (MSI) even without measuring the acceleration of the head or the angular velocity of the head of the occupant in real time.

Another example of a sensitivity index is the MSDV (Motion Sickness Dose Value). This is a value obtained by extracting a specific frequency component that is particularly likely to cause motion sickness among the acceleration components generated in the human body, and it is generally known that the higher the value of the frequency component is, the more likely motion sickness is to be caused. Therefore, in a case where there is a focus on this sensitivity index, the command value supplementation unit 22 generates an internal command to control front-rear, left-right, and up-down acceleration so as not to generate a specific frequency component for the sensitivity index.

Further, another example of a sensitivity index is a time constant with respect to a steering angle. This time constant is obtained by defining the response times (delay times) of the left-right acceleration and the respective roll and yaw rates as time constants with respect to a change in steering angle, and it is generally known that a vehicle that is easy to drive becomes a vehicle in which a difference between the time constants relating to the above three quantities of motion is small (values similar to those of the three quantities of motion). Therefore, in a case where there is a focus on this sensitivity index and the "difference in time constant" is used as an index, the command value supplementation unit 22 generates internal commands to control left-right, roll, and yaw so as to reduce the index.

Furthermore, other examples of sensitivity indexes include bio-signals (for example, sweating and heartbeat).

It is generally known that in a case where an occupant develops motion sickness, an increased heart rate, and sweating of the palms or forehead is observed. Therefore, in a case where there is a focus on this sensitivity index, the command value supplementation unit 22 generates internal commands to control the quantities of motion on the six axes so as to improve the bio-signal.

<Specific Example of Method for Generating Internal Command>

Next, a specific example of a method for generating an internal command by using the command value supplementation unit 22 when executing a desired driving operation will be described with reference to FIGS. 5 to 7.

Figure 5:
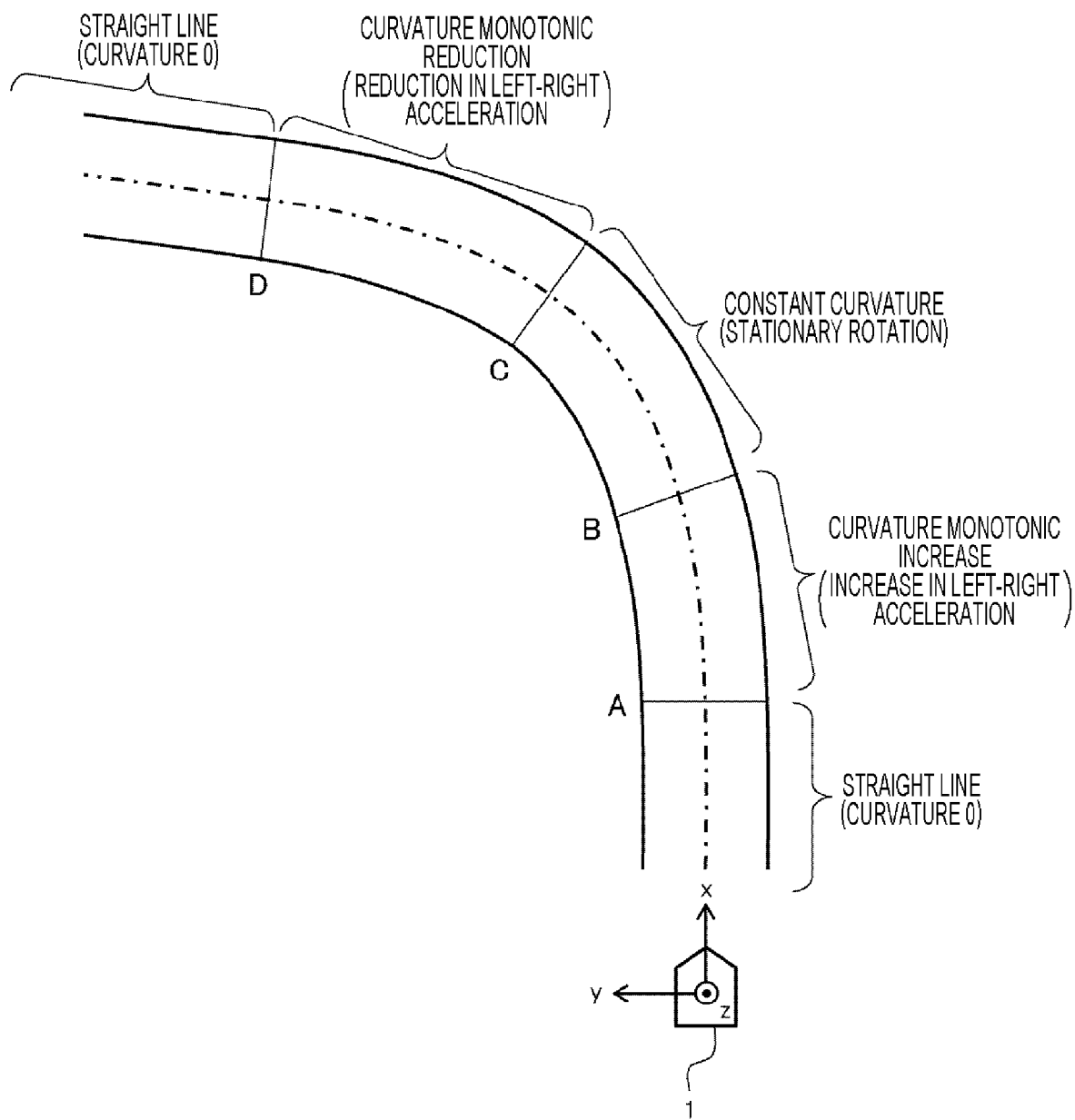
FIG. 5 is a plan view illustrating a vehicle entering a left hand curve.

FIG. 5 is a plan view showing the vehicle 1 entering a left hand curve, and the driving operation executed here is a left turn. The road shown here can be divided into a first section (up to A) having a curvature of zero, a second section (A to B) having a gradually increasing curvature, a third section (B to C) having a constant curvature, a fourth section (C to D) having a gradually decreasing curvature, and a fifth section (beyond D) having a curvature of zero.

FIG. 6(a) illustrates an external command "yaw command value" required for steering control, which is issued by the external control device 3 to the vehicle integrated-control device 2 when the vehicle 1 travels on the left hand curve in FIG. 5. As shown here, the yaw command value required in the first section (up to A) and in the fifth section (beyond D), which have a curvature of zero, is 0. In addition, the yaw command value required in the second section (A to B), in which the curvature gradually increases, increases monotonically, and the yaw command value required in the fourth section (C to D), in which the curvature gradually decreases, decreases monotonically. Further, the yaw command value required in the third section (B to C), in which the curvature is constant, is constant.

FIG. 6(b) illustrates the left-right acceleration that is actually generated in a case where the vehicle 1 is made to travel according to the yaw command value in FIG. 6(a). In a case where the yaw command value of FIG. 6(a) is inputted in advance from the external control device 3, the command value supplementation unit 22 is capable of calculating the left-right acceleration of FIG. 6(b) as an internal command prior to actual travel.

The broken line in FIG. 6(c) is a roll angle of the vehicle 1 that is predicted to be generated, by the left-right acceleration in FIG. 6(b), in conventional technology in which the control according to the present embodiment is not adopted. In the vehicle 1 of FIG. 5, because the roll angle in the case of a rightward lean is defined as positive while a leftward lean is defined as negative, it can be seen that a rightward-leaning roll occurs in the vehicle 1 traveling on the left hand curve of FIG. 5 unless the control according to the present embodiment is executed. In this case, according to the calculation method of FIG. 4, a large motion sickness incidence (MSI), as indicated by the broken line in FIG. 6(e), is calculated, and deterioration in ride comfort is confirmed.

Meanwhile, the solid line in FIG. 6(c) represents a roll angle which is generated as an internal command by the command value supplementation unit 22 according to the present embodiment. The roll angle generated here corresponds to an internal command to lean the vehicle 1 traveling on the left hand curve in FIG. 5 to the left. In this case, according to the calculation method of FIG. 4, a relatively small motion sickness incidence (MSI), as indicated by the solid line in FIG. 6(e), is calculated, and an improvement in ride comfort is confirmed.

FIG. 6(d) illustrates the motor driving force generated in each motor 12 by the operation amount control unit 23 in order to realize the roll angle indicated by the solid line in FIG. 6(c). That is, from the second section to the fourth section, a motor driving force in the positive direction is generated in the front-left and rear-right motors $12_{FL}$ and $12_{RR}$, and a motor driving force in the negative direction is generated in the front-right and rear-left motors $12_{FR}$ and $12_{RL}$.

Figure 6:
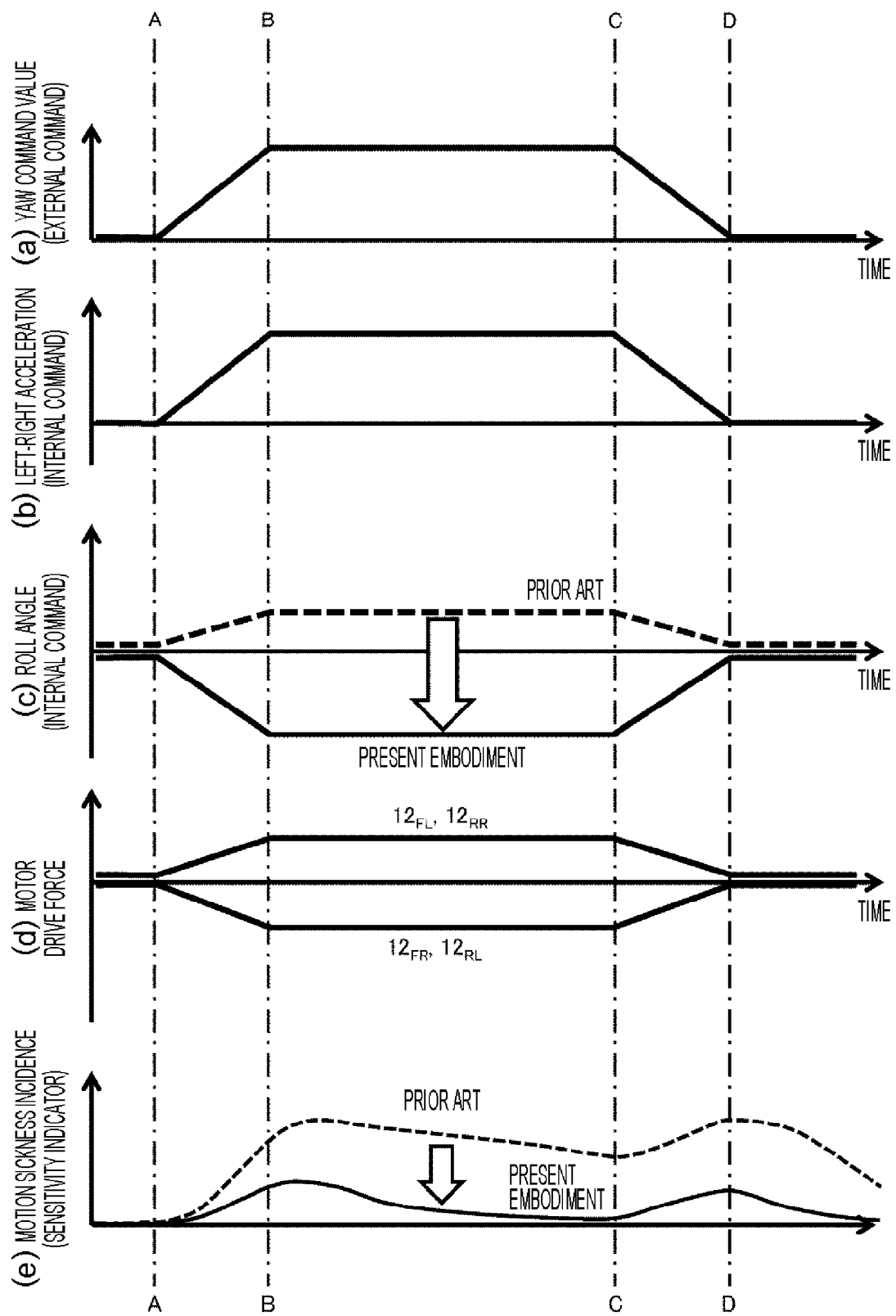
FIG. 6 is a specific example of a method for generating internal commands using a command value supplementation unit.
Figure 7:
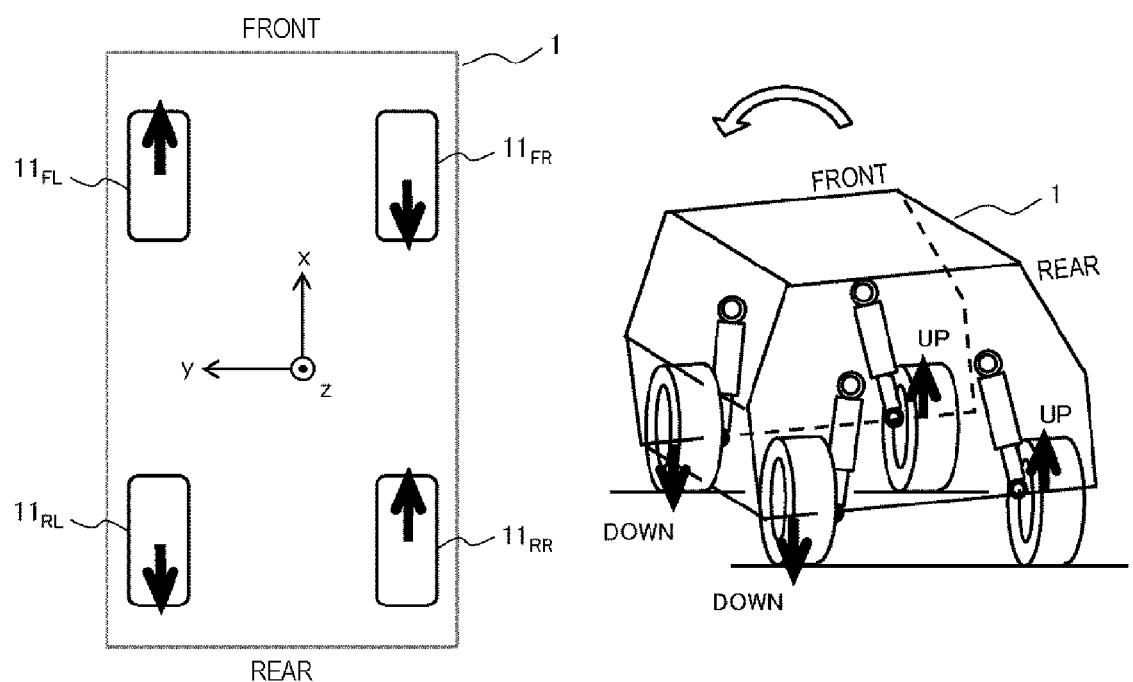
FIG. 7 illustrates attitude control of a vehicle 1 using the motor driving forces in FIG. 6(d).

As a result, as illustrated in the left-hand diagram of FIG. 7, a driving force in the positive direction is generated in the front-left wheel $11_{FL}$ and the rear-right wheel $11_{RR}$, and a driving force in the negative direction is generated in the front-right wheel $11_{FR}$ and the rear-left wheel $11_{RL}$. As a result, a suspension force in the DOWN direction on the left side and a suspension force in the UP direction on the right side are generated in the vehicle body 1 as illustrated in the righthand diagram of FIG. 7, and the vehicle 1 leans to the left due to these suspension forces, thus realizing attitude control for the vehicle 1 suitable for the roll angle of FIG. 6(c) that is generated as an internal command.

<Another Specific Example of Method for Generating Internal Command>

Next, a specific example of a method for generating an internal command by using the command value supplementation unit 22 when executing a desired driving operation will be described with reference to FIGS. 8 and 9.

Figure 8:
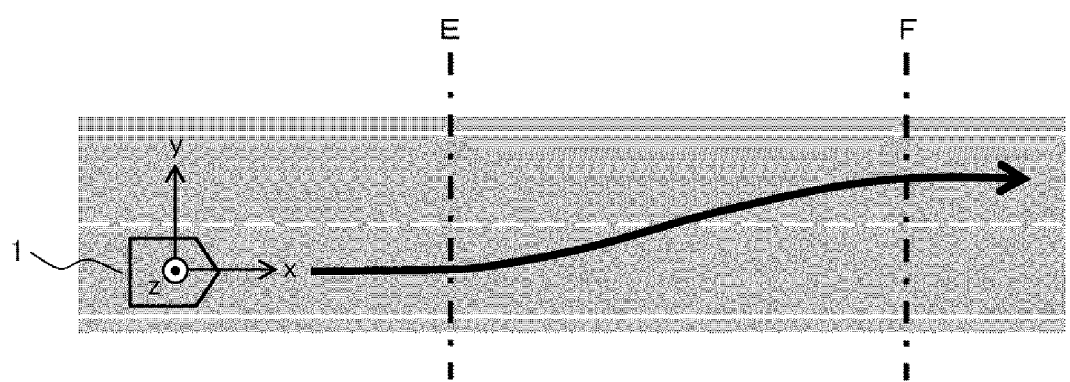
FIG. 8 is a plan view illustrating a vehicle changing lanes.
Figure 9:
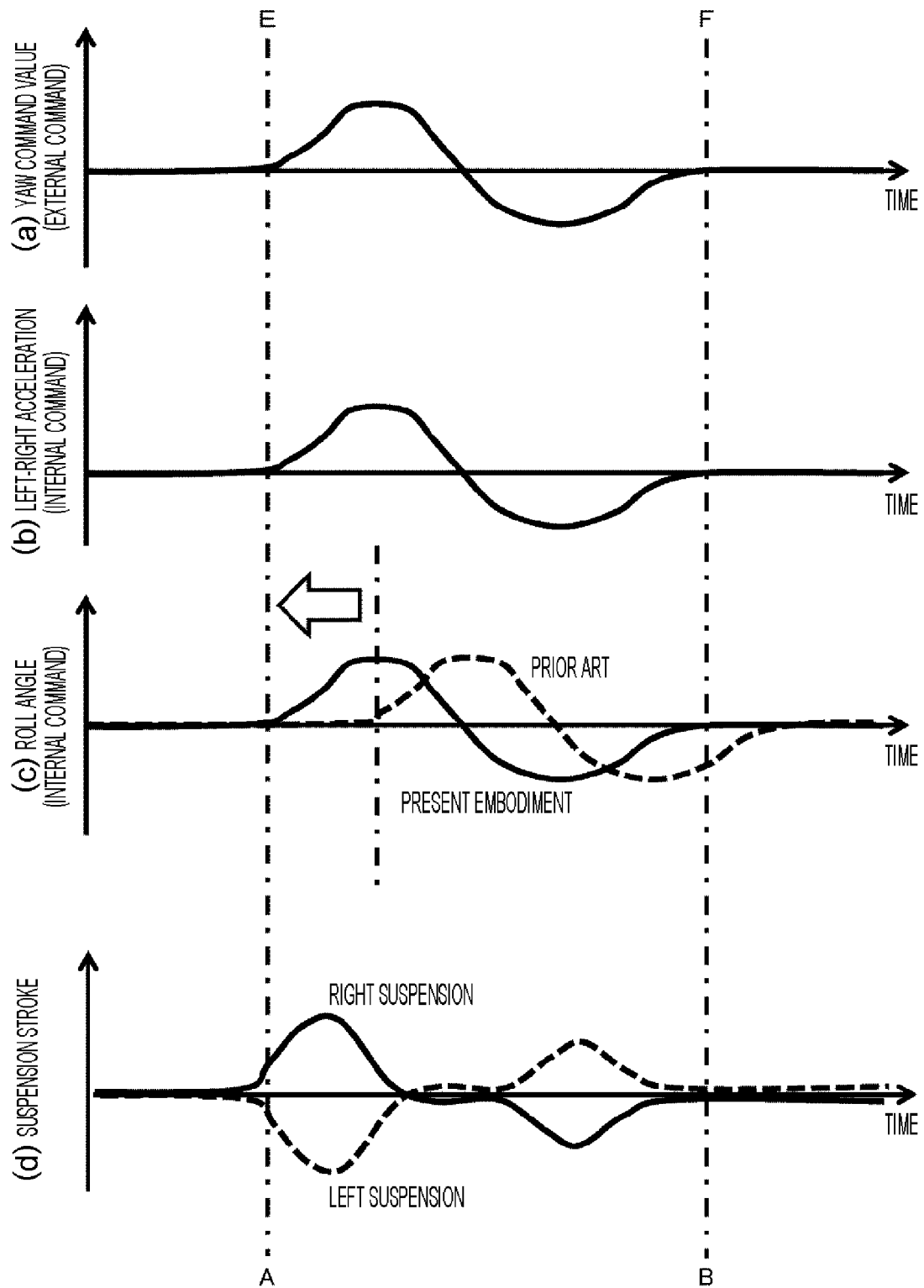
FIG. 9 is another specific example of a method for generating internal commands using the command value supplementation unit.

FIG. 8 is a plan view illustrating the vehicle 1 traveling on a straight road with two lanes on each side, and the driving operation executed here is a lane change from the right lane to the left lane. The road shown here can be divided into a sixth section (up to E) for which straight travel is scheduled, a seventh section (E to F) for which a lane change is scheduled, and an eighth section (beyond F) for which straight travel is scheduled.

FIG. 9(a) illustrates an external command "yaw command value" required for steering control, which is issued by the external control device 3 to the vehicle integrated-control device 2 when the vehicle 1 performs the lane change in FIG. 8. As shown here, the yaw command value required in the sixth section (up to E) and the eighth section (beyond F), for which straight travel is scheduled, is 0. Further, a positive-direction yaw command value is issued in a stage preceding the seventh section (E to F) in which a lane change is scheduled, and a non-directional yaw command value is issued in a subsequent stage.

FIG. 9(b) illustrates the left-right acceleration that is actually generated in a case where the vehicle 1 is made to travel according to the yaw command value in FIG. 9(a). In a case where the yaw command value of FIG. 9(a) is inputted in advance from the external control device 3, the command value supplementation unit 22 is capable of calculating the left-right acceleration of FIG. 9(b) as an internal command prior to actual travel.

The broken line in FIG. 9(c) is a roll angle of the vehicle 1 that is predicted to be generated by the left-right acceleration in FIG. 9(b) in conventional technology in which the control according to the present embodiment is not adopted. The left-right acceleration and the roll angle have substantially the same shape, but the roll angle may be delayed due to the left-right acceleration depending on the physical characteristics of the suspension system. Although this delay may occur even in the environment of FIG. 5, because the lane change in FIG. 8 is completed in a relatively short time unlike the left turn in FIG. 5, which takes a relatively long time, a time shift between the left-right acceleration and the roll angle has a large influence on the deterioration in ride comfort.

Therefore, as indicated by the solid line in FIG. 9(c), the command value supplementation unit 22 according to the present embodiment generates, as an internal command, a roll angle for synchronization with the left-right acceleration in FIG. 9(b). The roll angle generated here corresponds to an internal command for initially causing the vehicle 1 traveling in the seventh section of FIG. 8 to lean rightward and then causing the vehicle 1 to lean leftward, and controls the suspension stroke as illustrated in FIG. 9(d), for example. In this case, the difference in the response times (delay times) of the left-right acceleration, the respective roll and yaw rates with respect to the steering angle is reduced, and the travel stability of the vehicle 1 is improved, thus confirming the improvement in ride comfort. Note that it is not necessary to completely synchronize FIG. 9(b) and FIG. 9(c), and it is sufficient if the time delay between the acceleration in these drawings is a predetermined value or less.

With the vehicle integrated-control device and the vehicle integrated-control method of the embodiment described above, even if external commands are insufficient, internal commands to supplement the insufficient external commands are generated, and each actuator can be integrally controlled so as to improve the operational feeling of the driver and occupant ride comfort.

Second Embodiment

Figure 10:
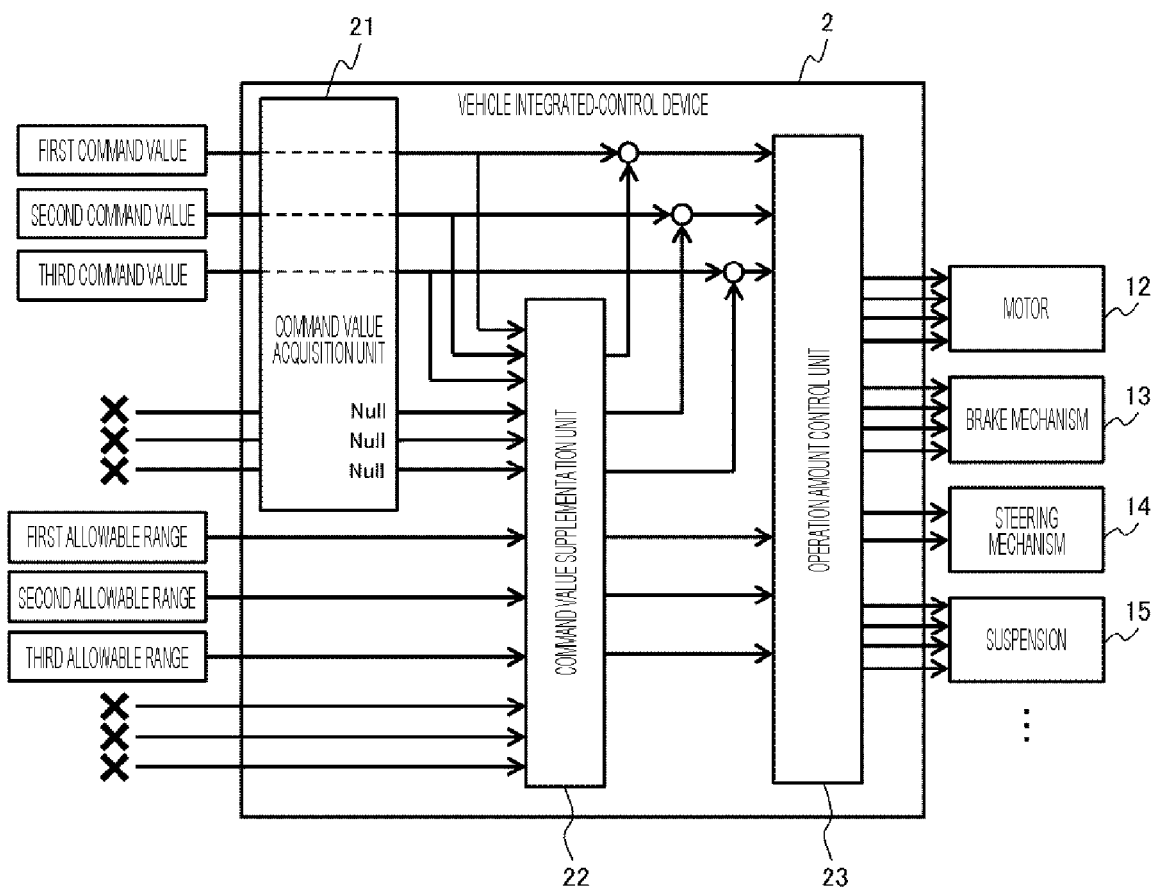
FIG. 10 is a functional block diagram of the vehicle integrated-control device according to a second embodiment.

Next, a vehicle integrated-control device according to a second embodiment of the present invention will be described with reference to FIGS. 10 and 11. Note that redundant descriptions of points in common with the first embodiment will be omitted.

In the vehicle integrated-control device 2 according to the first embodiment, as illustrated in FIG. 3, the external command is issued to the operation amount control unit 23 without further processing, and deterioration in the sensitivity index due to external command-based vehicle control is also permitted.

In contrast, in the vehicle integrated-control device 2 according to the present embodiment, external commands, which have been corrected as necessary, are issued to the operation amount control unit 23 so as to enable deterioration in the sensitivity index due to the external command-based vehicle control to be suppressed. Therefore, as illustrated in FIG. 10, the command value supplementation unit 22 according to the present embodiment generates internal commands enabling an improvement in the sensitivity index, based on the external commands (the first command value to the third command value) and the allowable fluctuation ranges (a first allowable range to a third allowable range), and simultaneously corrects the external commands so as not to cause deterioration in the sensitivity index.

Figure 11:
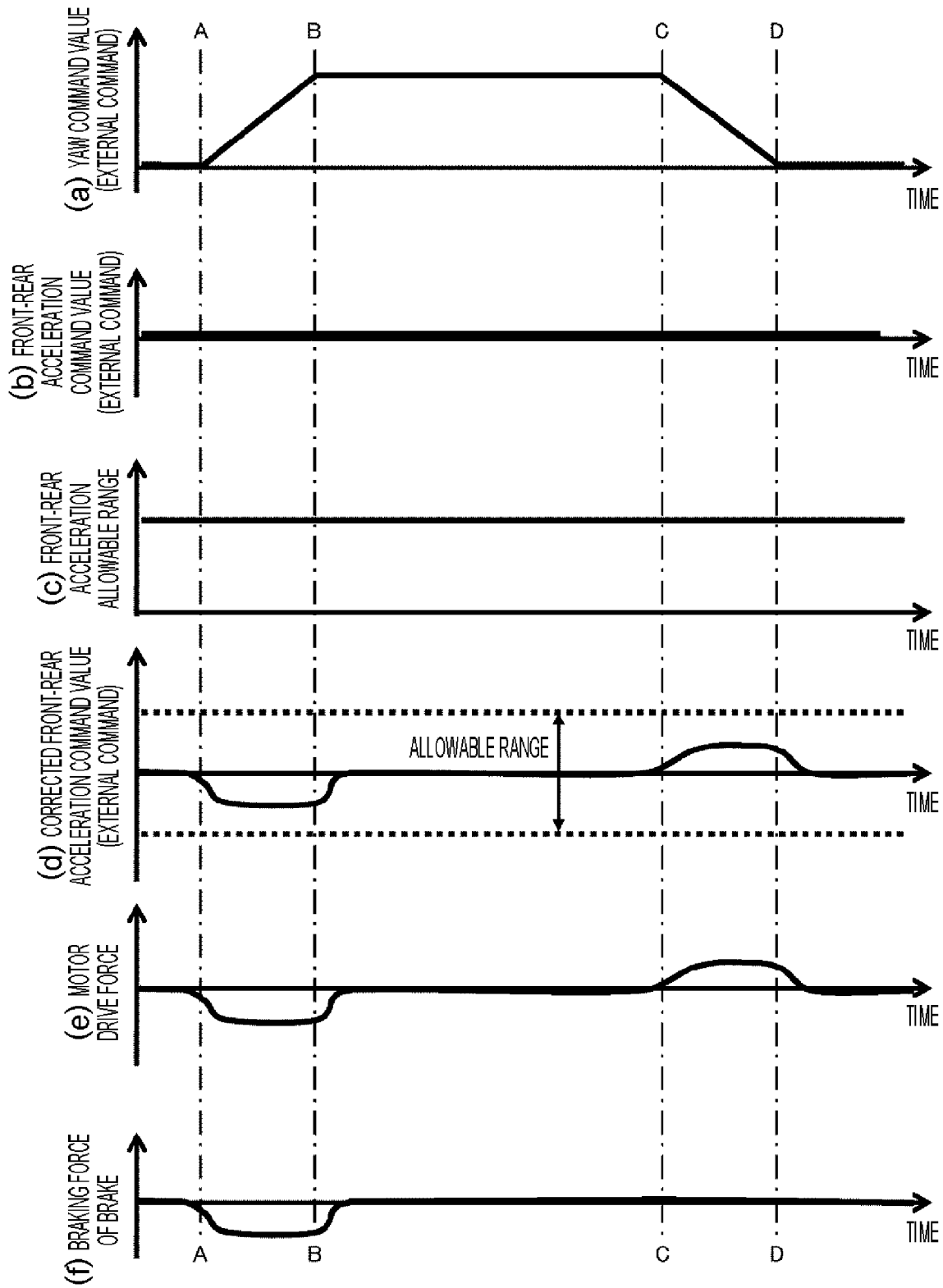
FIG. 11 is a specific example of a method for limiting external commands by using the command value supplementation unit.

FIG. 11 is a graph to specifically illustrate the control by the vehicle integrated-control device 2 according to the present embodiment, and is based on the premise of traveling in the same environment as in FIGS. 5 and 6 of the first embodiment.

FIGS. 11(a) and 11(b) illustrate the "yaw command value" and the "front-rear acceleration command value" that are inputted as external commands, and FIG. 11(c) illustrates the "front-rear acceleration allowable range" set for the front-rear acceleration command value. Note that FIG. 11(a) is equivalent to FIG. 6(a).

FIG. 11(d) illustrates a corrected front-rear acceleration command value (external command) that is generated based on the front-rear acceleration (external command) in FIG. 11(b) and the left-right acceleration (internal command) in FIG. 6(b). The corrected front-rear acceleration command value (external command) shown here is a command generated by adding or subtracting, to or from the front-rear acceleration, an amount that is proportional to the temporal change in the left-right acceleration with a primary delay of a predetermined time constant and that does not exceed the allowable fluctuation range. Based on this command, the operation amount control unit 23 controls the motor driving force and the brake braking force as illustrated in FIGS. 11(e) and 11(f), thus keeping the deterioration in the sensitivity index within a predetermined allowable range.

According to the present embodiment described above, in addition to the advantageous effects of the first embodiment, it is possible to suppress deterioration in a sensitivity index by using vehicle control which is based on a certain external command.

REFERENCE SIGNS LIST 1 vehicle
11 wheel
12 motor
13 brake mechanism
13a wheel cylinder
13b braking control device
14 steering mechanism
14a steering control device
14b steering motor
15 suspension
16 accelerator pedal
16a stroke sensor
16b acceleration control device
17 brake pedal
18 handle
18a steering torque detection device
18b steering angle detection device
18d steering motor
2 vehicle integrated-control device
21 command value acquisition unit
22 command value supplementation unit
23 operation amount control unit
3 external control device
4 combined sensor

The invention claimed is:

1. A vehicle integrated-control device that integrally controls a plurality of actuators mounted in a vehicle to control the vehicle using six control axes which are front-rear, left-right, up-down, roll, pitch, and yaw control axes, the vehicle integrated-control device comprising:
    a command value acquisition unit that acquires an external command corresponding to each of at least one and not more than six control axes for realizing a desired driving operation;
    a command value supplementation unit that generates an internal command for a control axis, among the six control axes, for which no external commands were input to the command value acquisition unit; and
    an operation amount control distribution unit that controls the plurality of actuators based on the external command and the internal command;
    wherein the internal command is a command for controlling the plurality of actuators so as to improve a sensitivity index relating to an occupant of the vehicle;
    wherein the command value supplementation unit corrects the external command based on an allowable fluctuation range that is set for each of the external commands;
    and wherein, in a case where commands pertaining to the front-rear control axis and the left-right or yaw control axis are inputted as the external commands,
    the command value supplementation unit corrects an external command pertaining to the front-rear control axis by adding or subtracting an amount proportional to a time change in left-right acceleration and not exceeding the allowable fluctuation range that is set for the external command pertaining to the front-rear control axis.

2. The vehicle integrated-control device according to claim 1,
    wherein the sensitivity index is any one of occupant motion sickness incidence, a motion stiffness dose value (MSDV), a time constant with respect to steering angle, and a bio-signal of the occupant.

3. The vehicle integrated-control device according to claim 1,
    wherein, in a case where a command pertaining to the left-right or yaw control axis is inputted as the external command, the command value supplementation unit generates the internal command such that left-right acceleration and a roll angle have a same phase or a time difference within a predetermined range.

4. The vehicle integrated-control device according to claim 1,
    wherein the external command is a command for executing driving support control or automatic driving control, which is inputted from an external control device.

5. The vehicle integrated-control device according to claim 1,
    wherein the external command is a command pertaining to any of the front-rear, left-right, and yaw control axes, which is generated based on an operation of a steering wheel, an accelerator pedal, or a brake pedal by a driver.

6. A vehicle integrated-control method that integrally controls a plurality of actuators mounted in a vehicle to control the vehicle using six control axes which are front-rear, left-right, up-down, roll, pitch, and yaw control axes, the vehicle integrated-control method comprising:
    a step of acquiring an external command corresponding to each of at least one and not more than six control axes for realizing a desired driving operation;

a step of generating an internal command for a control axis, among the six control axes, for which no external commands were input to the command value acquisition unit;

a step of controlling the plurality of actuators based on the external command and the internal command so as to improve a sensitivity index relating to an occupant of the vehicle;

a step of correcting the external command based on an allowable fluctuation range that is set for each of the external commands; and in a case where commands pertaining to the front-rear control axis and the left-right or yaw control axis are inputted as the external commands: a step of correcting an external command pertaining to the front-rear control axis by adding or subtracting an amount proportional to a time change in left-right acceleration and not exceeding the allowable fluctuation range that is set for the external command pertaining to the front-rear control axis.

* * * * *